United States Patent [19]
Smith

[11] Patent Number: 5,430,633
[45] Date of Patent: Jul. 4, 1995

[54] MULTI-RESONANT CLAMPED FLYBACK CONVERTER

[75] Inventor: David A. Smith, Silverstand, Hong Kong

[73] Assignee: Astec International, Ltd., Hong Kong

[21] Appl. No.: 121,168

[22] Filed: Sep. 14, 1993

[51] Int. Cl.⁶ ............................................ H02M 3/335
[52] U.S. Cl. ........................................ 363/20; 363/97; 363/131
[58] Field of Search ................. 363/20, 21, 86, 89, 363/95, 97, 131, 15, 16, 40, 41

[56] References Cited

U.S. PATENT DOCUMENTS

| | | | |
|---|---|---|---|
| 4,417,153 | 11/1983 | Onodera et al. | 307/140 |
| 4,559,590 | 12/1985 | Davidson | 363/21 |
| 4,809,148 | 2/1989 | Barn | 363/20 |
| 4,870,554 | 9/1989 | Smith | 363/20 |
| 4,870,555 | 9/1989 | White | 363/21 |
| 4,959,764 | 9/1990 | Bassett | 363/16 |
| 5,173,846 | 12/1992 | Smith | 363/20 |
| 5,304,875 | 4/1994 | Smith | 307/571 |
| 5,313,382 | 5/1994 | Farrington | 363/16 |
| 5,331,533 | 7/1994 | Smith | 363/20 |

OTHER PUBLICATIONS

Lo, et al., "Development of a DC-To-DC Power Converter for Distributed Power Processing," *Conference Proceedings of the 4th Annual IEEE Applied Power Electronics Conference & Exposition*, Mar. 13–17, 1989, pp. 413–422.

Jitaru, Ionel Dan, "Zero Voltage PWM, Double Ended Converter," *Proceedings of the High Frequency Power Conference (HFPC)*. May 1992, pp. 394–405.

"A 25 Watt Off-Line Flyback Switching Regulator," U–96A Application Note, *Linear Integrated Circuits Data and Applications Handbook*, Unitrode Corporation, pp. 9-47 through 9-51, Apr., 1990.

"Practical Considerations in Current Mode Power Supplies," U–111 Application Note, *Linear Integrated Circuits Data and Applications Handbook*, Unitrode Corporation, pp. 9-134 through 9-151, Apr., 1990.

Primary Examiner—Steven L. Stephan
Assistant Examiner—Adolf Berhane
Attorney, Agent, or Firm—Coudert Brothers

[57] ABSTRACT

A flyback-type power converter having a secondary-side resonant circuit which shapes the current waveform in the secondary winding and secondary circuit to reduce the RMS current values therein is described. The shaping reduces conduction losses and improves conversion efficiency. With the resonant circuit, the energy stored in the transformer is transferred during the OFF-period in substantially a fixed time duration, enabling a fixed-OFF period operation mode. The converter may further have a primary-side resonant circuit for capturing and recycling the energy stored the leakage inductance of the primary winding, which is normally wasted in snubber circuitry.

17 Claims, 5 Drawing Sheets

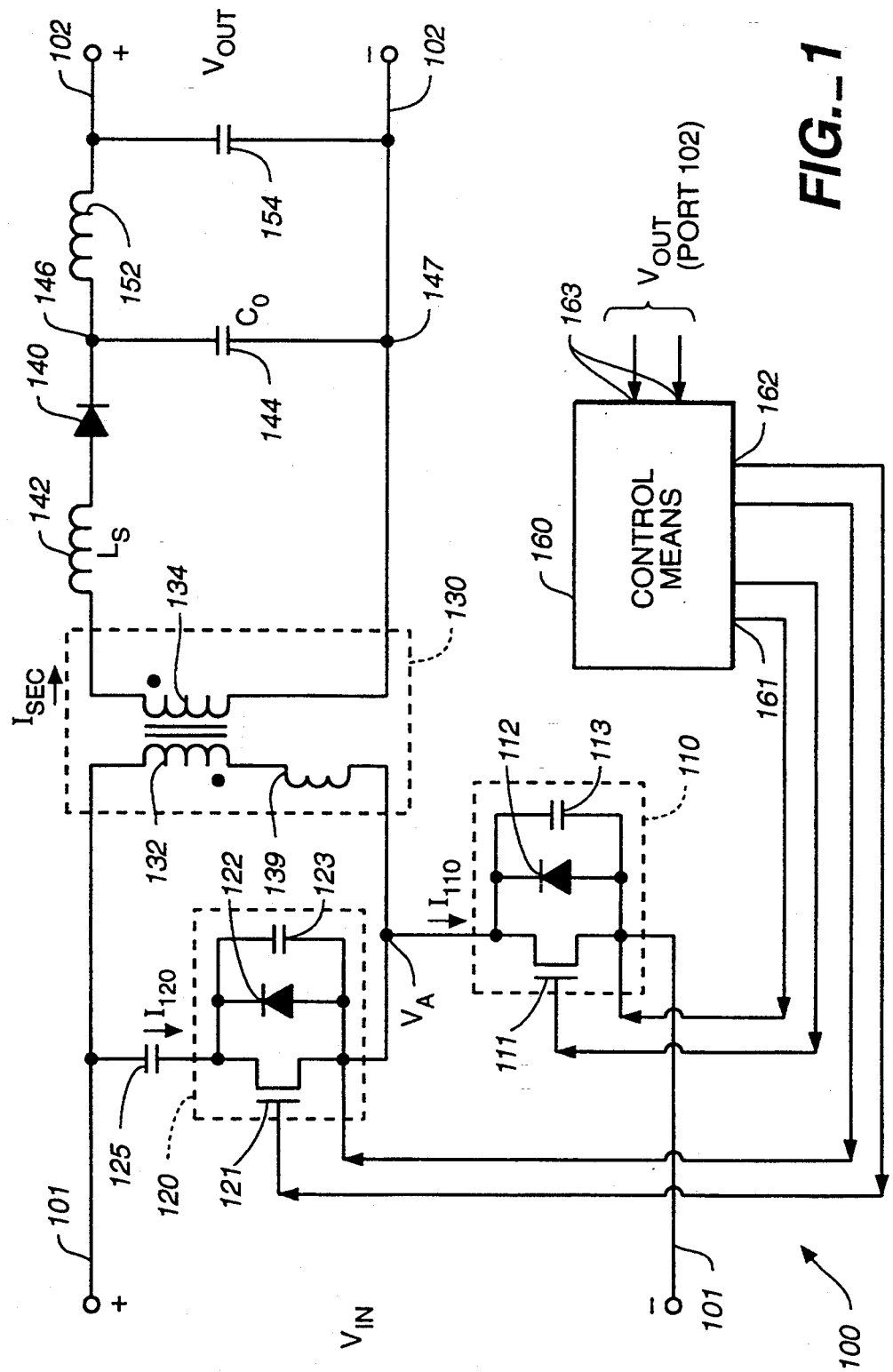
FIG._1

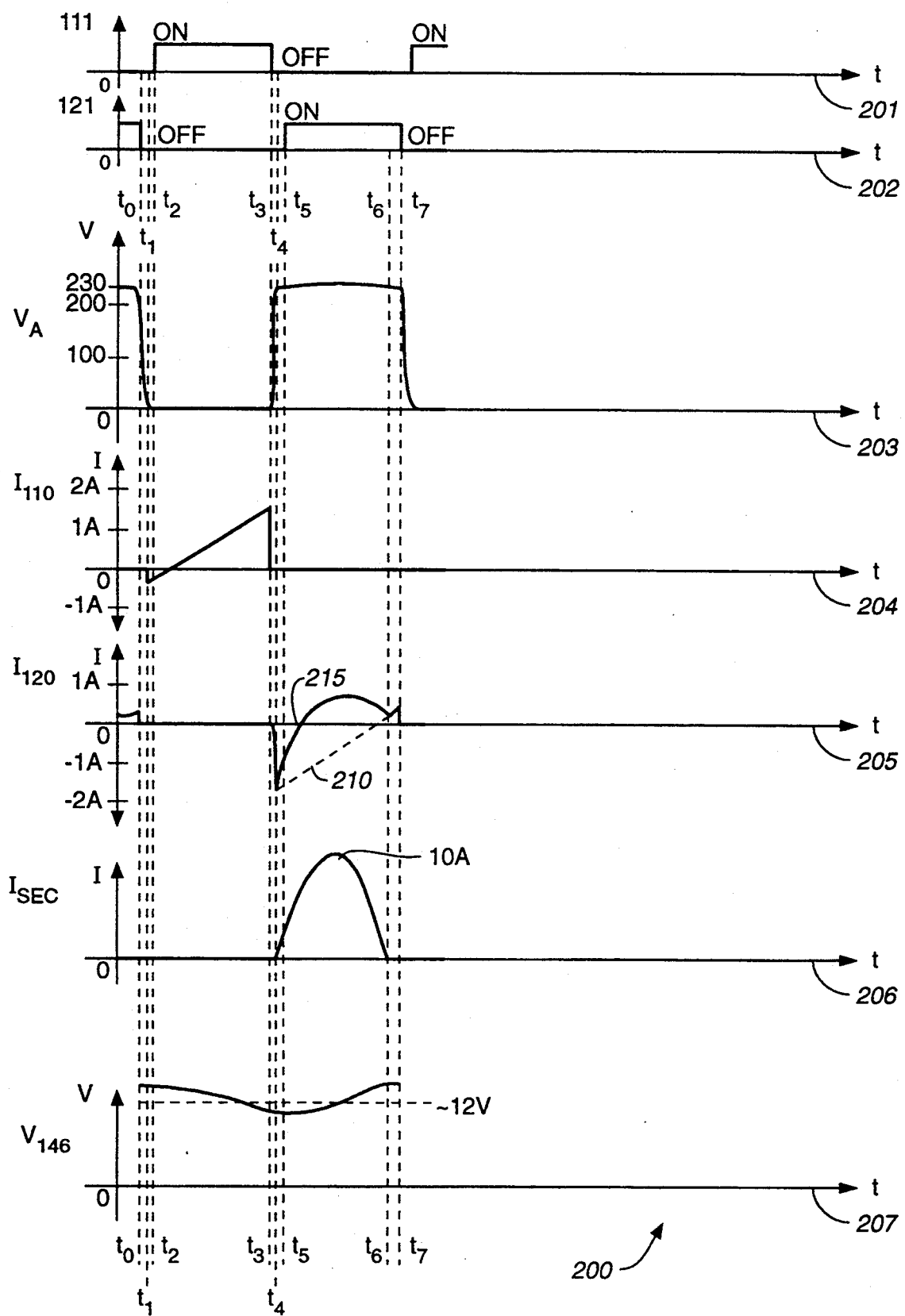
FIG._2

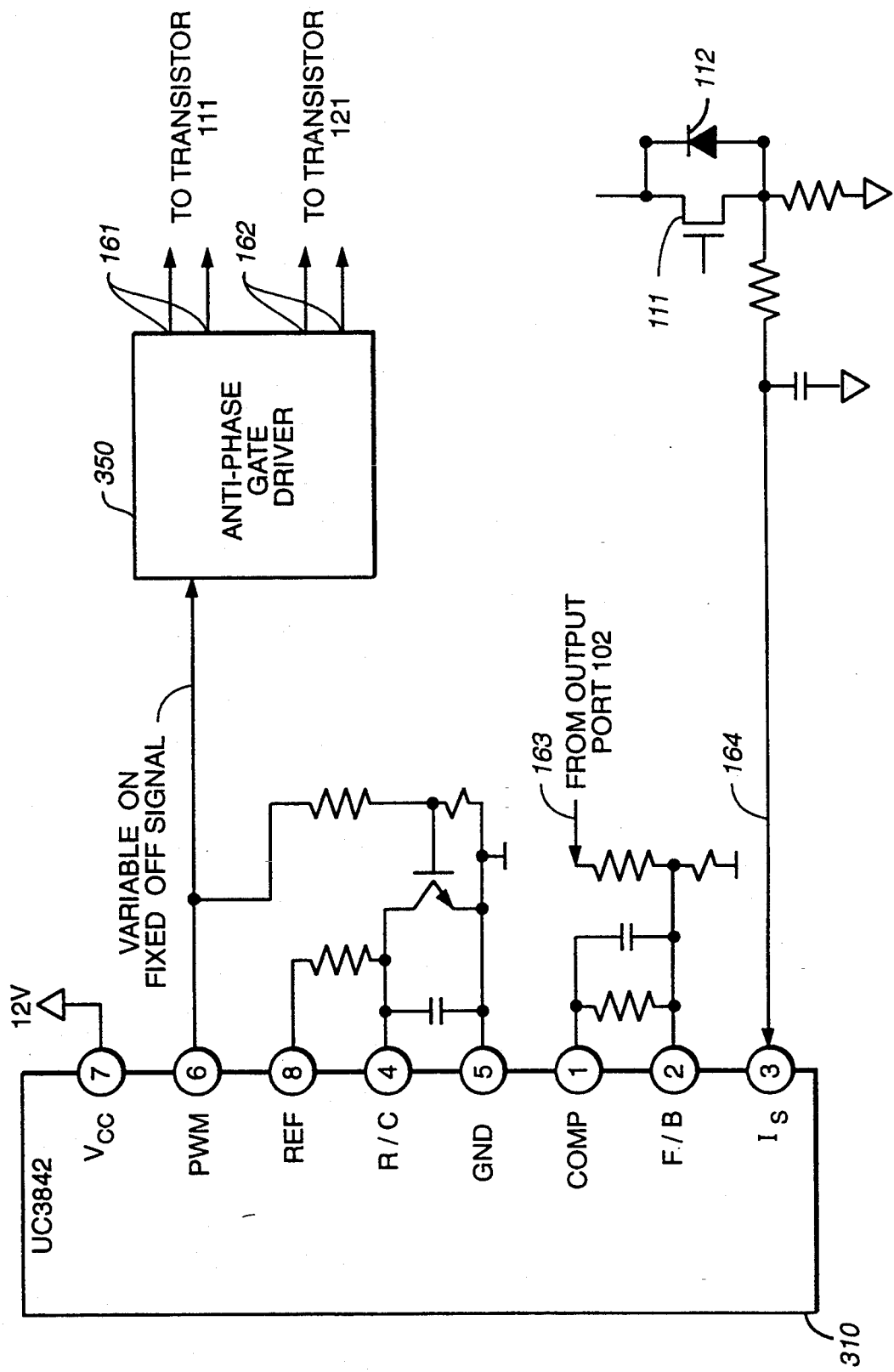
FIG._3

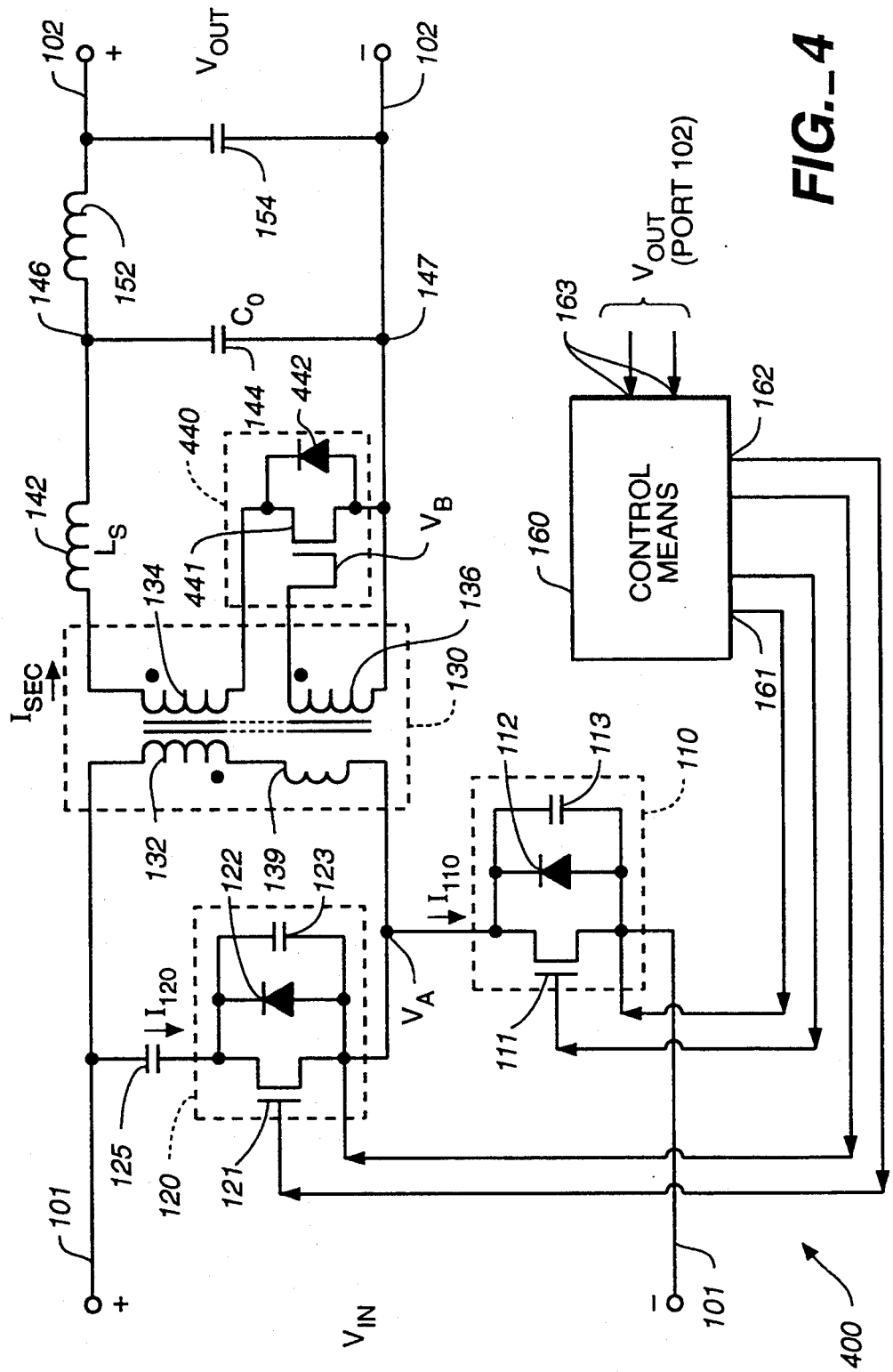
FIG._4

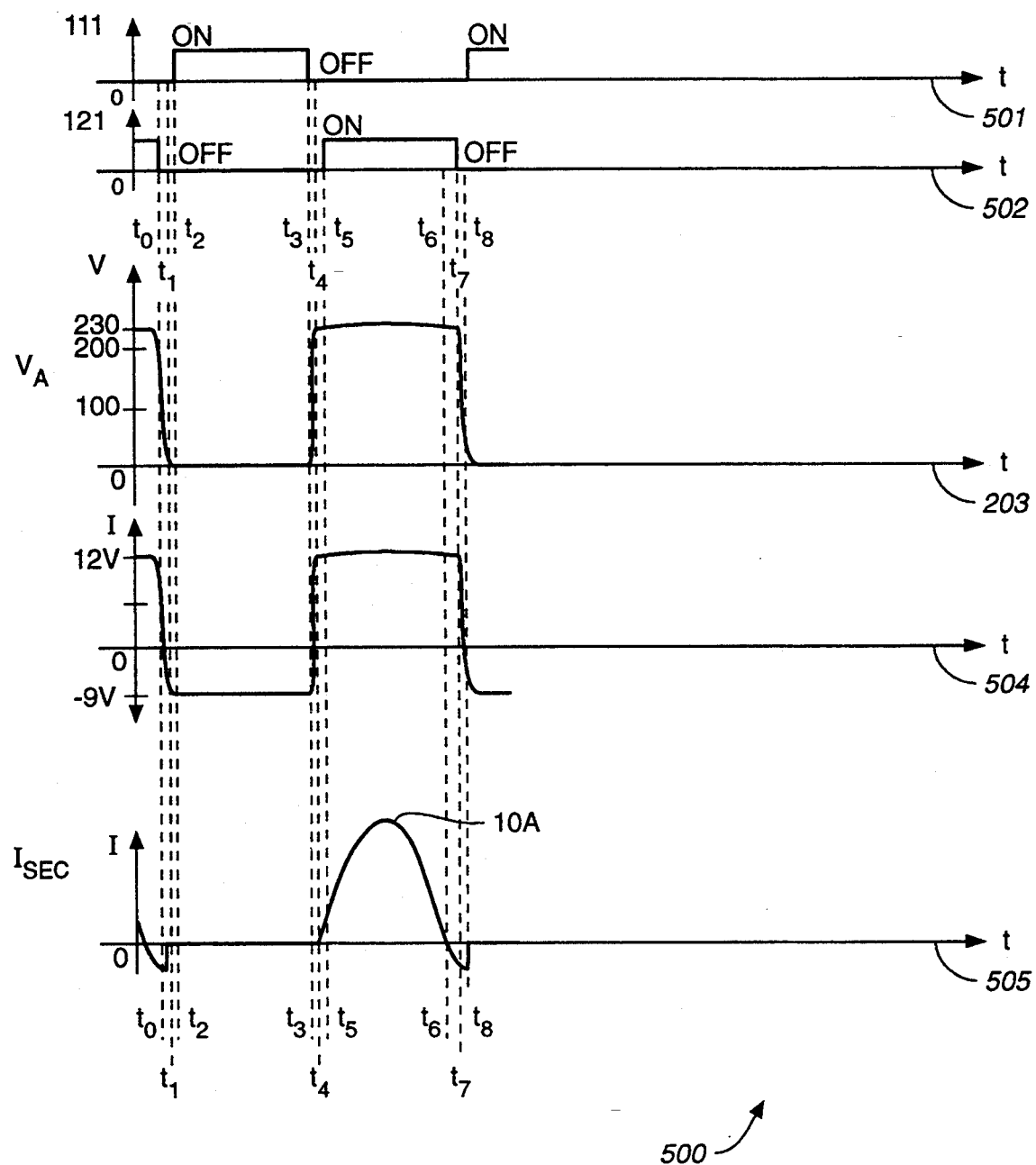
FIG._5

MULTI-RESONANT CLAMPED FLYBACK CONVERTER

FIELD OF THE INVENTION

The present invention relates to switching power supplies, and particularly to switching flyback converters and ways of improving the power conversion efficiency thereof.

BACKGROUND OF THE INVENTION

The present invention is directed toward improving the power conversion efficiency of switch mode flyback power converters. A typical flyback converter includes a transformer with primary and secondary windings, a primary switch coupled in series with the primary winding, a rectifier coupled in series with the secondary winding, and an output capacitor coupled across the series combination of the secondary winding and rectifier. The primary switch is alternately closed (ON-period) and opened (OFF-period) within a fixed switching period. The rectifier and transformer windings are oriented such that power is coupled and stored in the transformer when the primary switch is closed, and thereafter released and coupled to the output capacitor when the primary switch is opened. In the latter state, the voltage across the transformer windings reverses, or "flies back", to release the energy and to reset the transformer's core.

Common applications for flyback converters are AC adapters, which may, for example, deliver an output voltage in the range of between 9 VDC to 24 VDC at power levels of 20 to 50 watts, drawing power from a rectified AC mains, which may vary between 85 VAC to 270 VAC. The flyback converter is preferred to other converters for these applications because it does not require an output choke, and because it can be designed to operate over a wide range of input voltages. However, the flyback converter has the disadvantage of poor power conversion efficiency, which raises the converter's power dissipation. The dissipation is an important consideration in that many such AC adapters are enclosed in plastic packages which do not readily dissipate the heat generated by the converter's power dissipation.

The relatively large primary leakage inductance of the primary winding is one factor that decreases the power conversion efficiency of the flyback in comparison to other converters. When the primary switch is closed, energy is stored in both the transformer's core (magnetizing inductance) and in the primary leakage inductance. When the primary switch is opened, the energy in the core (magnetizing inductance) is coupled to the secondary circuit, but the energy stored in the primary leakage inductance rings with the capacitance of the primary switch, and is conventionally dissipated in a voltage clamping or "snubber" circuit connected to the primary switch. This dissipated energy can easily be as much as ten percent (10%) of the energy transferred to the secondary circuit when using a safety isolated transformer and operating the flyback in discontinuous mode.

Another factor that decreases the power conversion efficiency is the relatively large root-mean-square (RMS) current that flows in the secondary winding during the OFF-period of the primary switch. As is known in the art, the current through the secondary winding during the OFF-period has a triangular waveform, starting at the beginning of the OFF-period substantially equal in value to the magnetizing current flowing in the primary winding at the end of the ON-period times the transformer turns ratio, and ending near the end of the OFF-period at zero amperes. Because the current waveform has a high initial current value, it has a relatively high RMS value in comparison to a flat current waveform transferring the same amount of energy. As is known in the art, the resistive losses ($I^2R$) in the secondary winding and secondary circuit are proportional to the square of the RMS current.

A further factor that decreases the power conversion efficiency of a conventional flyback converter are power dissipation losses that occur in the primary switch when it closes. The primary switch is normally implemented with a power field effect transistor (FET). Although such FET's can switch relatively quickly in comparison to bipolar power transistors, a measurable amount of power is dissipated in the FET when it is turned on (closed), since the drain voltage takes a finite time to decrease to near zero while drain current is flowing. Ideally, the turn-on losses could be reduced if the drain voltage of the FET could be reduced before current is conducted, i.e., zero-voltage switching.

The present invention is directed towards reducing the power dissipation in each of the above areas.

SUMMARY OF THE INVENTION

Broadly stated, the present invention encompasses a flyback-type power converter having a secondary-side resonant circuit which shapes the current waveform in the secondary winding and secondary circuit to reduce the RMS current values therein. The shaping reduces conduction losses and improves conversion efficiency. With the resonant circuit, the energy stored in the transformer is transferred during the OFF-period in substantially a fixed time duration, enabling a fixed-OFF period operation mode.

In a preferred embodiment of the present invention, the time duration of the ON-period is varied to regulate the output voltage while the time duration of the OFF-period is fixed to substantially one-half the resonance period of the secondary-side resonant circuit. As the input voltage increases, energy is coupled to the transformer at a higher rate and the duration of the ON-period is decreased to regulate the output voltage to a desired value. As a consequence, the OFF periods occur more frequently and the peak amplitude of the current in the secondary circuit during the OFF periods decreases so as to maintain the required power to the load. The more frequent OFF periods with decreased peak currents reduce the RMS current value and resistive conduction losses in the secondary circuit as the input voltage increases. The variable ON-period operation also reduces the peak current flows in the primary winding, thereby reducing the RMS current value and the resistive conduction losses therein.

In another preferred embodiment, the power converter further comprises a second resonant circuit, called an active clamp, coupled to the transformer's primary winding. The active clamp captures the energy stored in the primary winding leakage inductance during the ON-period and returns the captured energy back to the input voltage source during the OFF-period. The return of this energy may also be used to obtain a zero-voltage switching condition, or at least a reduced-voltage switching condition, on the primary switch when it closes. Both the return of energy and the zero-voltage or reduced-voltage switching improves conversion efficiency.

Accordingly, it is an object of the present invention to reduce the power dissipation and to improve the power conversion efficiency of flyback converters.

It is another object of the present invention to capture and reuse the energy stored in the primary winding leakage inductance of a flyback converter.

It is a further object of the present invention to reduce the resistive conduction losses and RMS currents in the secondary winding circuit of a flyback converter.

These and other objects of the present invention will become apparent to those skilled in the art from the following detailed description of the invention, the accompanying drawings, and the appended claims.

BRIEF DESCRIPTION OF THE DRAWINGS

FIG. 1 is a schematic diagram of a first embodiment of the flyback converter according to the present invention.

FIG. 2 is a timing diagram of selected voltages and currents of the flyback converter shown in FIG. 1.

FIG. 3 is a schematic diagram of an exemplary control means according to the present invention.

FIG. 4 is a schematic diagram of another embodiment of the flyback converter according to the present invention.

FIG. 5 is a timing diagram of selected voltages and currents of the flyback converter shown in FIG. 4.

DETAILED DESCRIPTION OF THE INVENTION

A first embodiment of the power converter according to the present invention is shown at 100 in FIG. 1. Power converter 100 includes an input port 101 for receiving a source of input power ($V_{IN}$) and an output port 102 for providing power ($V_{OUT}$) to a load. Additionally, power converter 100 comprises a transformer 130 having a primary winding 132 and a secondary winding 134, a primary switch 110 coupled between primary winding 132 and the input power source at port 101, and a rectifier 140 coupled in series with secondary winding 134. Primary switch 110 is switched on and off so as to generate alternating ON and OFF periods, conducting current during the ON periods and substantially blocking current during the OFF periods. As described in greater detail below, primary switch 110 is preferably operated with its OFF periods having a substantially equal time duration of $T_{OFF}$.

Primary switch 110 preferably comprises a field effect transistor 111. Transistor 111 typically includes a body diode 112 coupled across the conduction terminals of transistor 111 and oriented so as to enable current to flow through primary winding 132 in the direction from the negative most terminal of port 101 to the positive most terminal thereof. As with all real switching devices, transistor 111 also has a stray (parasitic) capacitance, as shown at 113, coupled between its conduction terminals.

The conduction direction of rectifier 140 and the magnetic directions of windings 132 and 134 (see the reference dots in FIG. 1) are oriented in a flyback configuration. When primary switch 110 closes for an ON period, electrical energy from the input power source at port 101 is coupled to and stored in the core of transformer 130 in the form of magnetic energy. As is known in the art, the stored energy is related to the magnetizing inductance $L_M$, which is a function of the transformer's design, and the magnetizing current $I_M$, which is a function of $L_M$ and the time integral of the voltage across the primary winding. During the ON period, rectifier 140 blocks current flow from secondary winding 134 to output port 102. When primary switch 110 opens to initiate a subsequent OFF period, the stored energy in transformer 130 is coupled from secondary winding 134 to output port 102, with rectifier 140 conducting. The amount of energy stored in transformer 130 during each ON period is a function of the time duration of the ON period, $T_{ON}$. The energy subsequently transferred to the output load during the next OFF-period is likewise a function of $T_{ON}$. As described in greater detail below, the time duration $T_{ON}$ is preferably varied to regulate the voltage delivered to the load.

The transformers used in flyback power converters typically have a moderate amount of leakage inductance associated with their primary windings. For transformer 130, this leakage inductance is shown by an inductance 139, which is coupled in series with primary winding 132, as is well known in the art. When primary switch 110 is closed during an ON period, a current is generated through leakage inductance 139 and energy is stored therein. During the OFF period in a conventional flyback power converter, the current in inductance 139 would continue to flow, flowing into stray capacitance 113 of primary switch 110. A high-frequency resonant circuit is thereby formed. In prior art flyback converters, this resonant circuit is conventionally damped by a "snubber" circuit, dissipating the energy of this resonant circuit. Unfortunately, the values of leakage inductance 139 for flyback transformers is relatively large in comparison to the magnetizing inductances of such transformers, and a relatively large amount of energy is wasted in such snubber circuits.

According to the present invention, the energy in leakage inductance 139 is captured and returned to the input power source at input port 101 by an active clamp circuit, which is a type of resonant circuit and which is well known in the art. The active clamp circuit comprises a series combination of an auxiliary switch 120 and a storage capacitor 125. This series combination is preferably coupled to the switched terminal of primary winding 132 (i.e., the terminal of winding 132 which is coupled to primary switch 110). Auxiliary switch 120 operates substantially in anti-phase relation to primary switch 110. The operation of switches 110 and 120 is preferably non-overlapping, with auxiliary switch 120 closing after primary switch 110 opens and opening before primary switch 110 next closes. Like primary switch 110, auxiliary switch 120 preferably comprises a field effect transistor 121 having a body diode 122 and stray (parasitic) capacitance 123 coupled between the conduction terminals of transistor 121. Body diode 122 is oriented to enable the current from inductance 139 to flow into capacitor 125. However, it may be appreciated that switches 110 and 120 may instead comprise other types of switching devices, such as for example bipolar junction transistors.

When auxiliary switch 120 closes, capacitor 125 applies a reversing voltage to the series combination of the primary winding 132 and leakage inductance 139. The reversing voltage has a polarity which is opposite to that of the voltage applied to the series combination during the preceding ON period. During the initial portion of the OFF period, the energy stored in leakage inductance 139 flows into capacitor 125, increasing the charge stored thereon. However, because of the opposite polarity of the reversing voltage, the magnitude of the current through inductance 139 and winding 132 decreases toward zero amperes. Once reaching zero amperes, the reversing voltage of capacitor 125 causes a current to flow in the opposite direction through the series combination of inductance 139 and winding 132, thus returning the energy captured by capacitor 125 to the input power source at input port 101. The energy stored in leakage inductance 139 is thus returned to the input power source, rather than being dissipated as waste energy by a snubber circuit. Since this energy is not dissipated, the conversion efficiency of power converter 100 is improved over that of a conventional flyback converter.

Capacitor 125 preferably has a large capacitance, so that the reversing voltage is maintained, at a relatively constant value during the OFF period. As is known in the active clamp art, capacitor 125 naturally reaches, by transient charging, a well-defined voltage for each set of steady-state operating conditions.

Power converter 100 further comprises a control means 160 for controlling the conduction state of transistors 111 and 121 to provide the desired non-overlapping, anti-phase switching relationship between switches 110 and 120. Control means 160 includes a first control port 161 coupled to transistor 111 and a second control port 162 coupled to transistor 121. Each of control ports 161 and 162 include a control line coupled to the gate terminal of its corresponding transistor and a reference line (e.g., ground) coupled to the source terminal of its corresponding transistor. Each port 161 and 162 conveys a control signal having a first state for causing its corresponding transistor to become conductive and a second state for causing its corresponding transistor to become non-conductive. Control means 160 further includes means for generating the control signal to transistor 111 such that the signal alternates between these states, and such that transistor 111 is operated with a substantially constant (or fixed) non-conducting period to effect the desired constant OFF period duration for primary switch means 110. Control means 160 further comprises means for generating the control signal to transistor 121 in a non-overlapping anti-phase relationship to the operation of transistor 111. Various ways of generating the control signal to transistor 121 in this manner are known in the art and an explanation thereof is not necessary in order to understand the present invention and enable one of ordinary skill in the art to make and use the same. Such ways are described in the inventor's co-pending U.S. patent application Ser. Nos. 07/875,753, entitled "EFFICIENT TRANSISTOR DRIVE CIRCUIT FOR POWER CONVERTERS AND THE LIKE," and now U.S. Pat. No. 5,304,875, Ser. No. 07/944,130, entitled "ZERO VOLTAGE SWITCHING POWER CONVERTERS", now U.S. Pat. No. 5,331,533, and in U.S. Pat. No. 5,173,846, entitled "ZERO VOLTAGE SWITCHING POWER CONVERTERS", all of which are incorporated herein by reference.

In a preferred embodiment, control means 160 further includes means for generating the control signal to transistor 111 such that transistor 111 is operated with a variable conduction period to regulated the output voltage at port 102 to a desired target value. For this, control means 160 preferably also includes a port 163 for receiving the output voltage at port 102, or a signal representative thereof. Various ways of generating the control signal to transistor 111 in the above preferred manner are known in the art and an explanation thereof is not necessary in order to understand the present invention and enable one of ordinary skill in the art to make and use the same.

An exemplary fixed-OFF-period/variable-ON-period control circuit which may be used in the present invention is described in Application Note U-111 published by Unitrode Integrated Circuits entitled "Practical Considerations in Current Mode Power Supplies," *Linear Integrated Circuits Databook*, pp. 9–177 through 9–194, 1987, which is incorporated herein by reference. The pertinent portion of this exemplary circuit, as it may be applied to the present invention, is illustrated in FIG. 3 as a control means 300. Control means 300 may be used to implement control means 160 of FIG. 1. Control means 300 comprises a UC3842 current mode controller chip, shown at 310 with relevant pin notations, which is manufactured by Unitrode and is commercially available. Control means 300 comprises the same ports 161–163 as control means 160, shown in FIG. 1. Control means 300 further comprises a port 164 for receiving a measure of the current flow through primary switch means 110, since control chip 310 uses current mode control. As is well known in the art, this measure of current may be easily provided by a current sense transformer or a current sensing resistor, as is indicated in FIG. 3. The pulse width modulated (PWM) output of chip 310 is coupled to an anti-phase gate driver circuit, which generates the signal for transistors 111 and 121, as discussed above. Such circuits are known to the art, as indicated above, and may be readily used.

For shaping the currents in secondary winding 134 and the secondary circuit, power converter 100 further comprises a resonant circuit which includes rectifier 140, a resonant inductance 142 having a value $L_S$, and a resonant capacitance having a value $C_O$. Inductance 142 is coupled in series with rectifier 140 and secondary winding 134, and capacitance 144 is coupled in parallel with this series combination at nodes 146 and 147. The output of this resonant circuit is taken across capacitance 144 (nodes 146 and 147). In turn, nodes 146 and 147 are respectively coupled to the positive and negative terminal of output port 102 through a conventional filtering circuit including an inductor 152 and capacitor 154. In one embodiment, filter inductor 152 is coupled between node 146 and the positive terminal of port 102, filter capacitor 154 is coupled across the terminals of port 102, and node 147 and the negative terminal of port 102 are coupled together as the secondary-side ground.

At the beginning of each OFF period, the above-described reversing voltage is applied to leakage inductance 139 and primary winding 132, and hence to secondary winding 134. In a conventional flyback circuit, the secondary current would immediately flow with a high initial value and thereafter ramp down to zero amperes, causing a large initial RMS current. However, according to the present invention, inductance 142 initially "holds off" this large initial current from secondary winding 134, since the current through an inductor cannot change instantaneously ($V_L = L*dI/dt$). Instead, the current from winding 134 ramps up from zero amperes and is shaped by inductance 142, capacitor 144 and rectifier 140 to substantially have the shape of a half-cycle sinusoid, or half-cycle resonance. A secondary-side resonant circuit is thereby formed. Rectifier 140 prevents the secondary current from reversing directions, and thereby prevents the current from having a full-cycle sinusoidal, or resonance, shape. Accordingly, the secondary-side resonant circuit enables energy stored in transformer 130 during an ON period to be transferred to output port 102 during a subsequent OFF period. In preferred embodiments of the present invention, capacitor 125 has sufficient capacitance to keep the reversing voltage across the transformer windings nearly constant during the half-cycle resonance.

This half-cycle resonance of the current flow through secondary winding 134 is preferably completed substantially within the duration $T_{OFF}$ of the OFF period. However, half-cycle resonance times slightly greater than $T_{OFF}$ may be tolerated. In such cases, the secondary winding current preferably has a value by the end of the OFF period which is less than 10% to 25% of its peak value. If the half-cycle sinusoid does not reach zero amperes by the end of the OFF period, not all of the energy stored in transformer 130 is coupled to the load, and transformer 130 is not fully utilized. Both of these events may adversely effect conversion efficiency. Thus, although half-cycle resonance times which exceed $T_{OFF}$ are anticipated by the present invention, they are not preferred.

When filter components 152 and 154 are not employed, the values of inductance 142 and capacitance 144 are chosen in view of the anticipated load impedance to achieve the desired resonance characteristic. Well known circuit analysis techniques (e.g., phasor impedance analysis) may be used to compute the resonant frequency given the values of inductance 142, capacitance 144, and the load impedance. When filter components 152 and 154 are employed, the values of inductance 142, capacitance 144, filter inductor 152, and filter capacitor 154 are chosen to achieve the desired resonance characteristic. Again, well known circuit analysis techniques may be used in computing the resonant frequency. Generally, the values of capacitor 154 and inductor 152 may be made relatively large (e.g., larger than capacitor 144 and inductance 142, respectively) so that, at the desire resonant frequency, capacitor 154 holds the voltage at one side of inductor 152 nearly constant and inductor 152 looks more like a current sink to capacitance 144 than an inductance. In this case, the values of inductance 142 and capacitance 144 primarily determine the resonance characteristic.

In the preferred embodiment of the present invention, the half-cycle sinusoid in the secondary winding current occurs substantially within the fixed time duration $T_{OFF}$ for the OFF period. In this embodiment, filter components 152 and 154 are chosen to have values which do not substantially affect the resonance of current from secondary winding 134. To fit the half-cycle within the OFF period, inductance 142 and capacitance 144 are preferably chosen to have a resonant time period $T_0 = 2\pi(L_S C_0)^{\frac{1}{2}}$ which is slightly less than or substantially equal to twice $T_{OFF}$, or $2*T_{OFF}$. If $T_0$ is greater than $2*T_{OFF}$ in this embodiment, the half-cycle sinusoid would not reach zero amperes by the end of the OFF period.

In this embodiment, resonance time period $T_0$ may be smaller than $2*T_{OFF}$, in which case the half-cycle sinusoid in the secondary winding current ends before the end of the OFF period. More preferably, $T_0$ is set to substantially $2*T_{OFF}$ or slightly less so the half-cycle sinusoid uses substantially the entire OFF period. For a given amount of power transfer per OFF-period duration, a half-cycle sinusoid at $T_0 = 2*T_{OFF}$ has a lower peak value (because of its greater width) than a half-cycle sinusoid at $T_0 < 2*T_{OFF}$, and hence has a lower RMS current and lower $I^2R$ energy losses.

Exemplary component values for power converter 100 are provided in TABLE I.

TABLE I

| | |
|---|---|
| $V_{IN}$ | 80 VDC-380 VDC |
| $V_{OUT}$ | 12 V, 0 to 2.5 A output current |
| Transformer 130 | PQ2620 (22:2 (pri:sec), $L_M$ ~310 µH) |
| Transistors 111 and 120 | IRFBC40 |
| Capacitor 125 | 33 µF, 250 V |
| Rectifier 140 | C10PQ60 (10 A, 60 V) |
| Inductance 142, $L_S$ | 0.15 µH |
| Capacitance 144, $C_0$ | 4 µF, Multi-layer Ceramic (MLC) |

Guidelines for choosing the component values of converter 100 are now given. Capacitance 144 is preferably chosen to be as small as possible, which is generally much smaller than the typical output capacitor of a conventional flyback converter providing the same output power at the same input and output voltages. The value of capacitor 144 may be chosen such that the peak-to-peak ripple voltage is between 10% to 30% of the average voltage of capacitance 144 under the conditions of full load and minimum input voltage. In one embodiment, the value of capacitor 144 is chosen such that the maximum peak-to-peak ripple voltage across it is approximately 20% of the output voltage (2.8 V for 12 V $V_{OUT}$) under the condition of full load (i.e., maximum rated output current) and minimum input voltage. Inductance 142 is preferably chosen such that the half-cycle sinusoid is as wide as the OFF period duration $T_{OFF}$. Inductor 142 preferably comprises the leakage inductance of secondary winding 134, if this enables the preferred width of the half-cycle resonance. Inductor 142 may further comprise a discrete inductor component such that the combined inductances equal the desired inductance for $L_S$.

The magnetizing inductance $L_M$ of transformer 130, the inductance which stores energy for transfer to the secondary winding, is preferably chosen so that it can store sufficient energy for supplying the maximum output power level, plus circuit losses, plus an additional amount for zero-voltage switching. The turns ratio of the primary to secondary windings of transformer 130 is chosen in a conventional manner to achieve the best compromise between the ON-resistances and the breakdown voltages (non-conducting mode) of transistors 111 and 12 1 and rectifier 140. For a given turns ratio N, input voltage $V_{IN}$, and output voltage $V_{OUT}$, the voltage developed on capacitor 125 is approximately $N*V_{OUT}$. Accordingly, the breakdown voltages of transistors 111 and 121 should each be greater than the quantity $V_{IN}+N*V_{OUT}$, and the breakdown voltage of rectifier 140 should be greater than $(V_{IN}/N)+V_{OUT}$.

The value of capacitor 125 is preferably chosen to be greater than the value of capacitance 144, as reflected into the primary winding from the secondary winding, which is $C_0/N^2$.

The operation of power converter 100 is described in further detail with reference to a timing diagram 200 shown in FIG. 2. FIG. 2 illustrates selected voltages and currents in converter 100 using the component values in TABLE I. An input voltage of 100 VDC and a full output load current of 2.5 A are assumed. Timing diagram 200 comprises a number of graphs 201–207, each as a function of time. Time lines $t_0$ through $t_7$ cut vertically through the graphs at selected time points, as described below. The gate drive signal to transistors 111 and 121 are shown in graphs 201 and 202, respectively. A high signal level corresponds to a conducting state for the transistor, and a low signal level corresponds to a non-conducting state. The voltage $V_A$ at the node where switches 110 and 120 are coupled to primary winding 132 is shown in graph 203. The current through primary switch 110, as referenced in the direction which points into the drain of transistor 111, is shown in graph 204. This current is designated as $I_{110}$. The current through auxiliary switch 120, as referenced in the direction which points into the drain of transistor 121, is shown in graph 205. This current is designated as $I_{120}$. The current flowing out of secondary winding 134 at the magnetic reference dot shown in FIG. 1 is designated as $I_{SEC}$ and is shown at graph 206 in FIG. 2. The voltage at node 146 is designated as $V_{146}$ and is shown in graph 207.

At time $t_0$, transistor 121 is rendered non-conductive by control means 160 to initial the end of an OFF period (graph 202). As described above, capacitor 125 has applied a reversing voltage to the series combination of leakage inductance 139 and primary winding 132 which has reversed the current flow through these components so that it is directed into the positive terminal of input port 101. Between times $t_0$ and $t_2$, both transistors 121 and 111 are in non-conducting states. The current flow through inductance 139 and winding 132 completes its path through stray (parasitic) capacitors 111 and 123, which causes the voltage $V_A$ to decrease from a high value around 230 V towards zero volts (graph 203).

At time $t_1$, the voltage at $V_A$ reaches approximately zero volts (e.g., $-0.5$ V) and body diode 112 conducts the current flowing in inductance 139. This initiates the ON period of primary switch 110. Voltage $V_{IN}$ is applied to the series combination of primary winding 132 and leakage inductance 139. A short time later at time $t_2$, transistor 111 of primary switch 110 is rendered conductive by control means 160. Zero-voltage switching is thereby effected across primary switch 110 and, in contrast to a conventional flyback converter, substantially no power is dissipated in the switching transition.

With transistor 111 conducting, voltage $V_{IN}$ is applied across winding 132. $V_{IN}$ causes the flow of current through winding 132 to reverse directions and build in magnitude between times $t_2$ and $t_3$, as shown in graph 204 by the current $I_{110}$ though primary switch means 110. The current $I_{110}$ increases substantially at a linear rate, as governed by the magnetizing inductance $L_M$ of transformer 130 and the leakage inductance 139. Energy is thereby stored in the core of transformer 130 for later transfer to the load via secondary winding 134. The amount of energy stored in the core is substantially equal to $\frac{1}{2}(L_M I_{110}^2)$. Energy is also stored in leakage inductance 139.

At time $t_3$, transistor 111 is rendered non-conductive by control means 160 to end the ON period of primary switch means 110 and start the OFF period thereof. Between times $t_3$ and $t_5$, both transistors 121 and 111 are again in non-conducting states. The current flow through inductance 139 and winding 132 again completes its path through stray (parasitic) capacitors 111 and 123, which causes the voltage $V_A$ to increase from a low value around 0 V towards a high value of approximately 230 V (graph 203).

At time $t_4$, the voltage at $V_A$ (graph 203) reaches a value approximately equal to the sum of input voltage $V_{IN}$ plus the voltage on capacitor 125, the sum being approximately 230 V for the above conditions, and body diode 122 of auxiliary switch 120 conducts the current flowing in winding 132 and inductance 139. This initiates the conduction state (ON period) of auxiliary switch 120 by conducting current through rectifier 122. Voltage across capacitor 125 is applied to the series combination of primary winding 132 and leakage inductance 139. A short time later at time $t_5$, transistor 121 of auxiliary switch 120 is rendered conductive by control means 160. Zero-voltage switching is thereby effected across auxiliary switch 120. The voltage on capacitor 125 continues to be applied to the series combination of windings 132 and inductance 139.

From times $t_4$ to time $t_7$, the reversing voltage across primary winding 132 is transformed over to secondary winding 134. (Because the magnetizing inductance $L_M$ of transformer 130 is generally much greater than leakage inductance 139, most of the voltage across capacitor 125 is applied to primary winding 132.) In response to the voltage across secondary winding 134, the resonant circuit formed by inductance 142, capacitance 144, and rectifier 140 is excited, and current from secondary winding 134, $I_{SEC}$, flows in a half-cycle sinusoidal shape (graph 206), as discussed above. The secondary winding current $I_{SEC}$ substantially starts at time $t_4$ and ends at a time $t_6$, which preferably occurs before the initiation of the OFF period for auxiliary switch 120 at time $t_7$. Time $t_7$ corresponds to time $t_0$ in the switching cycle of power converter 100. For the above stated conditions and component values, current $I_{SEC}$ reaches a peak value of approximately 10 A approximately midway between times $t_4$ and $t_6$.

From time $t_4$ to $t_6$, varying portions of the magnetizing current built up in transformer 130 are diverted away from primary winding 132 to support the current $I_{SEC}$ in secondary winding 134, and thereby transfer energy stored in the core to the secondary circuit. This may be indirectly seen in graph 205 (FIG. 2) which shows the magnitude of the current $I_{120}$ flowing through auxiliary switch 20. A dashed line 210 shows how current $I_{120}$ would flow through switch 120, winding 132 and inductance 139 if the magnetizing current were not diverted to secondary winding 134. Accordingly, dashed line 210 essentially shows the magnetizing current component. The solid line in graph 205 from time $t_4$ through time $t_7$ shows the flow of current through switch 120, primary winding 132, and inductance 139 with the diversion of magnetizing current to secondary winding 134. The solid line crosses zero amperes sooner than the dashed line 210, indicating that the magnetizing current has been diverted.

The portion of magnetizing current that is not diverted to the secondary winding is coupled to capacitor 125, which stores the charge carded by this portion. The excess magnetizing current portion is stored from time $t_4$ to substantially when current $I_{120}$ reaches zero amperes, which is shown at a point 215 in graph 205. At point 215, the magnetizing current can no longer support the entire amount of reflected secondary current $I_{SEC}$. Capacitor 125 supplies the difference between the magnetizing current and the reflected $I_{SEC}$, as shown by the positive portion of $I_{120}$ in graph 205.

Between time $t_4$ and point 215, the energy stored by leakage inductance 139 is also coupled to capacitor 125, along with the excess magnetizing current energy. This energy is later returned between point 215 and time $t_7$. A portion of this returned energy is shown by the current $I_{120}$ through auxiliary switch 120 between the times $t_6$ and $t_7$.

Graph 207 of FIG. 2 shows the resulting voltage at node 146. Under the above stated conditions, the ripple voltage at this node has a peak-to-peak value of ~2.8 V. When the input voltage is increased to 300 V, this ripple voltage falls to ~1.3 V due to the shortened duration of the ON periods.

As indicated above, according to a preferred embodiment of the present invention, the ON-period time duration of the primary switch is varied to regulate the output voltage while OFF-period duration of the primary switch is substantially fixed. This results in a variable frequency switching period, which lowers RMS currents and $I^2R$ losses in the primary winding and active clamp over these in a conventional active-clamp flyback converter operated with fixed switching periods (i.e., variable ON and OFF periods). In a conventional active-clamp flyback converter, the peak-to-peak current in the primary circuit, and thus RMS current therein, is proportional to the voltage across the clamp capacitor. The clamp capacitor voltage is approximately equal to the reflected output voltage multiplied by the conduction time of the clamp's auxiliary switch (i.e., roughly equal to the OFF period duration of the primary switch). Under fixed frequency operation, the output voltage is line regulated by reducing the ON-period time duration of the primary switch with increasing input voltage. As a result, OFF-period time duration increases, which increases conduction time for the clamp's auxiliary switch and thereby increases peak-to-peak and RMS currents in the primary circuit of the conventional active-clamp converter. In contrast, with fixed OFF period time duration in a preferred embodiment of the present invention, these primary RMS currents are substantially constant, and do not substantially increase with increasing input voltage.

To further increase the efficiency of power converters according to the present invention, the rectifying means provided by rectifier 140 may also be provided by a synchrouous rectifier device. Such a device generally comprises an active switch element capable of selectively conducting current with lower power dissipation than a conventional power rectifier, thereby increasing power conversion efficiency. An embodiment of the present invention employing a synchronous rectifier is shown at 400 in FIG. 4. With the exception of rectifier 140, converter 400 comprises the above-described elements of converter 100. In place of rectifier 140, converter 400 comprises a synchronous rectifier 440, which preferably includes a field effect transistor 441 having a body diode 442 coupled between the conduction terminals of transistor 441. Body diode 442 is oriented to enable current to flow from the dotted terminal of secondary winding 134 to capacitance 144 and output port 102 (i.e., in the same direction as rectifier 140 of converter 100). In converter 400, transformer 130 further includes a third winding 136 magnetically coupled to windings 132 and 134, and electrically coupled between the control terminal of transistor 441 (e.g., gate terminal) and a selected conduction terminal thereof (e.g., source terminal).

The voltage across third winding 136 is related to the voltage across primary winding 132, as proportioned by the turns ratio between windings 132 and 136, and generates a control signal for controlling the conduction state of transistor 441. During the ON period of primary switch 110, winding 136 generates a negative voltage which renders transistor 441 non-conductive, thereby preventing current flow in the secondary circuit. During the OFF period of primary switch 110, winding 136 generates a postive voltage which renders transistor 441 conductive, thereby enabling power transfer to the secondary-side resonant circuit.

In one embodiment of the present invention, the turns ratio between windings 132 and 163 is 22:2, and transistor 441 comprises an International Rectifiers IRFZ44, which has a gate threshold voltage ranging between approximately 2 V to 4 V, an ON-resistance of approximately 0.028 ohms, and a voltage rating of approximately 60 V.

The operation of synchronous rectifier 440 in converter 400 is described in further detail with reference to a timing diagram 500 shown in FIG. 5. FIG. 5 illustrates selected voltages and currents in converter 400 using the component values in TABLE I and the above component values of rectifier 440 and third winding 136. As with timing diagram 200 shown in FIG. 2, an input voltage of 100 VDC and a full output load current of 2.5 A are assumed in diagram 500. Timing diagram 500 comprises a number of graphs 501–505, each as a function of time. Time lines $t_0$ through $t_8$ cut vertically through the graphs at selected time points, as described below. As in diagram 200, the gate drive signal to transistors 111 and 121 are shown in graphs 501 and 502, respectively, and the voltage $V_A$ is shown in graph 503. The voltage across winding 136, designated as $V_B$ in the figures, is shown at graph 504, and the current $I_{SEC}$ through secondary winding 134 is shown at graph 505. Voltage $V_B$ swings between ~−9 V (ON period of primary switch 110) and ~12 V (OFF period of primary switch 110), and has a waveform which is substantially proportional, to first order, to the waveform shape of voltage $V_A$.

Prior to time $t_0$, the voltage $V_B$ (graph 504) provided by winding 136 is above the threshold voltage of transistor 441 (e.g., 2–4 V), rendering synchronous rectifier 440 conductive. At time $t_0$, transistor 121 in the primary circuit is rendered non-conductive by control means 160 to initial the end of an OFF period (graph 502). Between times $t_0$ and $t_2$, the current flow through inductance 139 and winding 132 decreases the voltage $V_A$ towards zero volts by discharging stray capacitors 113 and 123. Voltage $V_B$ falls towards ~−9 V. At time $t_1$, the voltage at $V_A$ reaches approximately zero volts, with body diode 112 conducting the current flow of primary switch 110, and voltage $V_B$ reaches ~−9 V. Shortly after time $t_0$, voltage $V_B$ falls below the threshold voltage, initiating the turn off of transistor 441. A short time later, as determined by the discharge rate of the transistor's gate capacitance, transistor 441 becomes non-conductive and remains non-conductive until a time near time $t_4$.

As in converter 100, transistor 111 of primary switch 110 is rendered conductive by control means 160 at time $t_2$. Between times $t_2$ and $t_3$, energy is stored in the core of transformer 130. At time $t_3$, transistor 111 is rendered non-conductive by control means 160 to end the ON period of primary switch means 110 and start the OFF period thereof.

Between times $t_3$ and $t_5$, both transistors 121 and 111 in the primary circuit are again in non-conducting states. The current flow through inductance 139 and winding 132 raises voltage $V_A$ to its high value of approximately 230 V (graph 503). Voltage $V_B$ rises towards ~12 V. At time $t_4$, voltage at $V_A$ reaches its high value, with body diode 122 of auxiliary switch 120 conducting, and voltage $V_B$ reaching its high value of ~12 V. At time $t_5$, transistor 121 of auxiliary switch 120 is rendered conductive by control means 160. Between times $t_3$ and $t_4$, voltage $V_B$ rises above the threshold voltage of transistor 441, initiating the turn on of transistor 441. A short time later, as determined by the charging rate of the transistor's gate capacitance, transistor 441 becomes conductive. If transistor 441 is not conductive by time $t_4$, body diode 442 will conduct the secondary winding current $I_{SEC}$.

From times $t_4$ to time $t_7$, the reversing voltage of capacitor 125 is applied to primary winding 132, which is transformed over to secondary winding 134. In response to the voltage across secondary winding 134, the secondary-side resonant circuit is excited and current $I_{SEC}$ from secondary winding 134 flows in a half-cycle sinusoidal shape (graph 505), as discussed above. The current $I_{SEC}$ substantially starts at time $t_4$ and undergoes a positive half-cycle resonance, which ends at time $t_6$ when $I_{SEC}$ reaches zero. From time $t_6$ to time $t_8$, $I_{SEC}$ begins to undergo a negative half-cycle since transistor 441 is still conductive. At time $t_7$, which corresponds to time to in the switching cycle, control means 160 renders transistor 121 of auxiliary switch 120 non-conductive, which causes voltage $V_A$ and $V_B$ to again fall. A short time after time $t_7$, voltage $V_B$ falls below the threshold voltage of transistor 441, initiating the turn off of the device. A short time later at time $t_8$, as determined by the discharge rate of the transistor's gate capacitance, transistor 441 becomes non-conductive to stop the negative flow of current $I_{SEC}$.

In preferred embodiments of the present invention, the resonance period and OFF-period duration $T_{OFF}$ are chosen to minimize the amount of negative current flow in $I_{SEC}$. Such negative currents transfer energy from the secondary circuit back to the transformer and primary circuit.

In an alternative embodiment, the control signal generated by third winding 136 may instead be provided by the control signal at port 162, which provides the control signal for auxiliary switch means 120. In this embodiment, the control signal from port 162 is coupled to the control terminal of transistor 441 through a conventional voltage isolation circuit. Such isolation circuits are well known in the art.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A power converter comprising:
   an input port for receiving a source of input power and an output port for providing power to a load;
   a transformer including a primary winding and a secondary winding;
   a primary switch coupled between said primary winding and said input power source, said primary switch having an ON period when closed and an OFF period when opened, said primary switch being caused to switch in alternating ON and OFF periods with said OFF periods having a substantially equal time duration of Torts, said primary switch, when closed, causing energy from said power source to be stored in said transformer; and
   a first resonant circuit coupled between said secondary winding and said output port for enabling energy stored in said transformer during an ON period to be transferred to said output port during a subsequent OFF period, said resonant circuit comprising an inductance in series with said secondary winding, a capacitor coupled in parallel with the series combination of said inductance and said secondary winding, and a rectifying means in series with said secondary winding for enabling power to flow to said output port during said OFF periods, said resonant circuit resonating during each OFF period such that the current flow through said secondary winding has a half-cycle resonance occurring substantially within said OFF period.

2. The converter of claim 1 wherein said half-cycle resonance of said current through said secondary winding has a peak value during said OFF period, and wherein said half-cycle resonance of said current has a value less than approximately ten percent of said peak at the end of said OFF period.

3. The converter of claim 1 wherein said inductance and capacitance of said first resonant circuit have a full-cycle resonant time period which is less than or substantially equal to twice the time duration $T_{OFF}$.

4. The converter of claim 1 wherein said secondary winding includes a leakage inductance and wherein said inductance of said first resonant circuit comprises said leakage inductance.

5. The converter of claim 1 wherein said converter is operated over a predetermined range of input voltages and is capable of providing at least a predetermined maximum output current level to the load over said input voltage range, and wherein the value of said capacitance of said first resonant circuit is chosen such that the peak to peak ripple voltage across said capacitance is not more than thirty percent of the average value of voltage across said capacitance when said input voltage is substantially at the low end of said input voltage range and the output current to the load is substantially at said maximum output current level.

6. The converter of claim 1 wherein said primary winding comprises a leakage inductance which stores energy from said input power source during each ON period of said primary switch, and wherein said converter further comprises a second resonant circuit coupled to said primary winding for recycling the energy stored in said leakage inductance back to said input power source during a subsequent OFF period, said second resonant circuit comprising a storage capacitor and an auxiliary switch coupled in series with said storage capacitor, said auxiliary switch being closed substantially during said OFF periods and opened substantially during said ON periods.

7. The converter of claim 6 wherein the capacitance of said storage capacitor is greater than the capacitance of said first resonant circuit divided by the square of said transformer's turns ratio N.

8. The converter of claim 6 wherein said primary switch is closed with substantially zero volts across it, and wherein said auxiliary switch is closed with substantially zero volts across it.

9. The converter of claim 1 wherein said rectifying means comprises a rectifier.

10. The converter of claim 1 wherein said rectifying means comprises a synchronous rectifier.

11. The converter of claim 10 wherein said transformer further includes a third winding for generating a control signal to said synchronous rectifier, said control signal causing said synchronous rectifier to become conductive during said OFF period.

12. The converter of claim 11 wherein said synchronous rectifier comprises a transistor and a body diode, said transistor having a control terminal coupled to said control signal and two conduction terminals for conducting current through said transistor.

13. A power converter comprising:
an input port for receiving a source of input power and an output port for providing power to a load;
a transformer including a primary winding and a secondary winding;
a primary switch coupled between said primary winding and said input power source, said primary switch having an ON period when closed and an OFF period when opened, said primary switch being caused to switch in alternating ON and OFF periods with said OFF periods having a substantially equal time duration of $T_{OFF}$, said primary switch, when closed, causing energy from said power source to be stored in said transformer; and
a first resonant circuit coupled between said secondary winding and said output port for enabling energy stored in said transformer during an ON period to be transferred to said output port during a subsequent OFF period, said resonant circuit comprising means for coupling current from said secondary winding to said output port during said OFF period substantially as a half-wave cycle, an inductance in series with said secondary winding, and a capacitor coupled in parallel with the series combination of said inductance and said secondary winding, said resonant circuit resonating during each OFF period such that the current flow through said secondary winding has a half-cycle resonance occurring substantially within said OFF period.

14. The power converter of claim 13 wherein said means for coupling current from said second winding to said output port comprises a rectifier in series with said secondary winding.

15. The power converter of claim 13 wherein said means for coupling current from said second winding to said output port comprises a synchronous rectifier in series with said secondary winding.

16. The converter of claim 15 wherein said transformer further includes a third winding for generating a control signal to said synchronous rectifier, said control signal causing said synchronous rectifier to become conductive during said OFF period.

17. The converter of claim 16 wherein said synchronous rectifier comprises a transistor and a body diode, said transistor having a control terminal coupled to said control signal and two conduction terminals for conducting current through said transistor.

* * * * *

UNITED STATES PATENT AND TRADEMARK OFFICE
CERTIFICATE OF CORRECTION

PATENT NO. : 5,430,633
DATED : July 4, 1995
INVENTOR(S) : Smith

It is certified that error appears in the above-indentified patent and that said Letters Patent is hereby corrected as shown below: On the title page: Item

[75] Inventor: delete "Silverstand" and insert therefor --Kowloon--.

Column 8, line 49, delete "12 1" and insert therefor --121--.

Column 10, line 55, delete "carded" and insert therefor --carried--.

Column 13, line 24, delete "to" and insert therefor --$t_o$--.

Column 14, line 4, delete "Torts" and insert therefor -- $T_{off}$--.

Column 5, line 64, delete "regulated" and insert therefor --regulate--.

Column 12, line 4, delete "postive" and insert therefor --positive--.

Column 12, line 42, delete "initial the" and insert therefor --the initial--.

Signed and Sealed this

Twenty-fourth Day of October, 1995

Attest:

BRUCE LEHMAN

*Attesting Officer*      *Commissioner of Patents and Trademarks*